Figure 1:
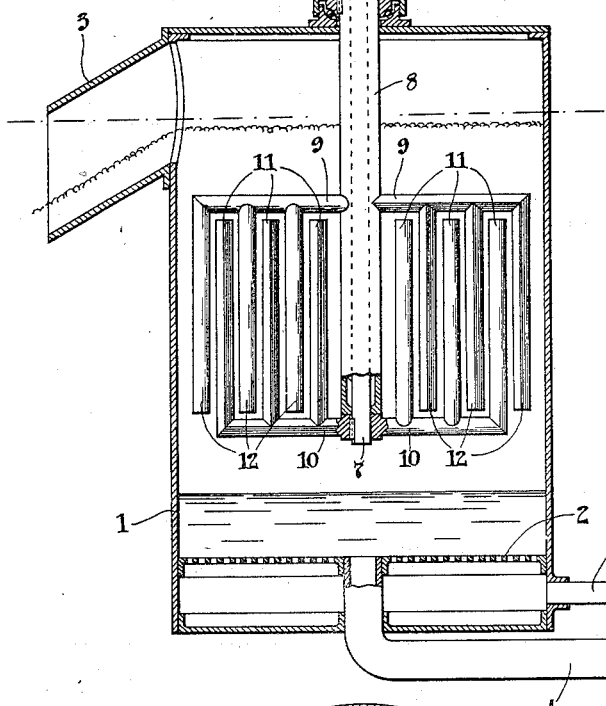

Dec. 3, 1929.    G. M. THOMSON    1,737,623

PROCESS FOR THE PRODUCTION OF DENSE FOAM

Filed Dec. 20, 1926

GEORGE MILLER THOMSON
INVENTOR.

By  *Marks & Clark*

ATTORNEYS.

Patented Dec. 3, 1929

1,737,623

UNITED STATES PATENT OFFICE

GEORGE MILLER THOMSON, OF CALEDONIA, ONTARIO, CANADA, ASSIGNOR, BY MESNE ASSIGNMENTS, TO CANADA GYPSUM AND ALABASTINE COMPANY, LIMITED, OF PARIS, ONTARIO, CANADA

PROCESS FOR THE PRODUCTION OF DENSE FOAM

Application filed December 20, 1926. Serial No. 156,059.

This invention relates to a process and apparatus for the production of dense uniform foam, such, for example, as is well adapted for the manufacture of cellular building materials.

The production of foam in the usual sense is a simple and common occurrence, involving the inclusion of volumes of air within films of water to form bubbles, which accumulate in a mass of foam. In attempting, however, to produce a dense, homogeneous foam suitable for commercial use in the arts, unexpected difficulties were encountered and this invention is designed to overcome such difficulties and to produce in a simple, economical manner a foam well adapted to meet all the requirements of the arts.

In the usual method of preparing a foam, viscous liquids or solutions are employed as the foam-forming liquid, and these are whipped into a foam or lather. In such processes, no regard is paid, and indeed none need be, to securing uniformity in the foam, and such processes are totally unsuited for the production of uniform dense foam, useful in the preparation of cellular building materials, where uniformity is of prime importance.

The object of the invention is thus to provide a simple process and apparatus which may be operated continuously or periodically, as desired, to produce a homogeneous foam of any required density and having sufficient "body" to make it capable of withstanding the usage incident to its being formed into, or incorporated in, industrial products. Obviously such a foam must be so formed that the film surrounding the individual volumes of air will not be readily ruptured, that its density may be regulated in accordance with the specific requirements of the use to which it is to be applied and that the bubbles of which it is formed will be substantially unform in size. Furthermore, in order that the foam may meet the requirements of the specific use to which it is to be applied, the process and apparatus for producing it must be subject to such control that the several characteristics required of the foam may be readily imparted to it by regulation of the operation of the process and apparatus.

For example, in the production of cellular building materials, such as wall-board or blocks, it is desirable that the cellular structure be homogeneous throughout, that is, that the size of the pores be substantially uniform and that they be uniformly distributed throughout the mass. In order that this uniformity in the material may be obtained, when using pre-made foam, the foam itself must be homogeneous and its density must be regulated in accordance with the weight desired in the finished material. This invention however is directed to the production of the foam itself and not to the manner of using it.

Briefly stated the invention resides in a process and apparatus for the production of foam comprising passing air in regulated volumes into colloidalized water and reducing the size of the bubbles formed in accordance with the density required in the foam produced.

Figure 3:
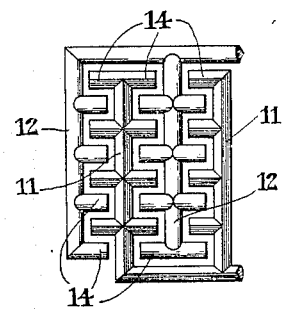
Figure 2:
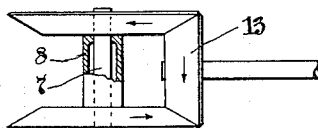

The invention will now be described in detail, reference being made to the accompanying drawing, which illustrates by way of example one form of apparatus for operating the process and in which Figure 1 is a sectional elevation, Figure 2 is a plan view of the apparatus shown in Figure 1, Figure 3 is a fragmentary view of one of each set of vertical arms with additonal agitating blades secured thereto.

The tank or chamber 1 has a perforated plate 2 located above its bottom and a discharge spout 3 near its top. The valve-controlled pipe 4 conducts suitably colloidalized water from a source of supply and discharges the same into the tank immediately above the perforated plate. The pipe 5 having a valve 6 is connected to a source of air in which the pressure may be controlled as desired, and discharges into the zone beneath the perforated plate in the tank 1. The shaft 7 has secured to its lower end one or more horizontal arms 10, provided with vertical arms 11 and the hollow shaft 8 which surrounds shaft 7 carries one or more horizontal arms 9 which are likewise provided with downwardly projecting vertical arms 12. These shafts are rotated in opposite directions by any suitable means, as illustrated at 13. The vertical arms may be provided with horizontal blades 14 as illustrated in Figure 3.

All of the agitating arms or blades are made "stream-line" in shape, that is, each arm is tapered to a relatively sharp edge at the rear, as illustrated, particularly in Figure 2, for reasons to be described later.

The operation of the invention will now be described as follows.

Colloidalized water, that is, water to which a foaming agent such as saponin, organic acids, aldehydes, sugar, etc., is added in the quantity required to impart a desired surface tension to the bubbles to be formed, is caused to flow into the tank 1 through pipe 4 until a depth of several inches, say three to five, of colloidalized water rests upon the perforated plate 2. At the same time air from a suitable source of supply, under substantially constant pressure, is caused to flow through pipe 5, by regulation of valve 6, into the space in the tank below the perforated plate, through which it passes in fine streams and enters the colloidalized water. Bubbles thus form in and rise to the surface of the water, where they accumulate in the form of a light foam, the bubbles being relatively large and substantially uniform in size.

The size of the bubbles formed depends on the size of the perforations in the plate 2 and the velocity of the air admitted through such holes. The smaller the perforations for a fixed air velocity, the smaller will be the bubbles formed. Likewise the less the velocity of air for perforations of constant diameter, the smaller will be the bubbles formed.

When the light foam thus formed rises to a point where it is engaged by the stirring or agitating device carried by the shafts 7 and 8, the bubbles are reduced in size to form a foam of the required density by the repeated agitating or cutting action of the arms 11, 12 and 14. As the foam rises it becomes more dense until it rises above the agitating device and it is later discharged through the spout 3.

The amount of reduction in size of the bubbles is directly related to the extent of agitating or cutting action of the arms and thus to the speed of the revolving arms and the duration of their action on the foam. The greater the angular velocity of the arms for a given period the smaller will be the resulting bubbles and the denser the foam.

The agitating arms are suspended above the surface of the colloidalized water so that the water exerts an even pressure on the rising air currents. If the agitating arms entered the water, vacuum pockets might be formed, which would tend to produce zones of less pressure on the rising currents of air and thus air might escape entirely or varying sized bubbles might be formed. It is therefore necessary that the agitation be confined to the foam alone. Accordingly the agitating arms engage the rising layer of light foam in a zone wholly above the surface of the column of water.

The two sets of agitating arms travelling in opposite directions are used to minimize the effect of centrifugal force, which would tend to throw the foam outwards, leaving less depth of foam near the shaft and therefore less pressure downwards, permitting the larger bubbles to break through to the surface near the shaft, without being sufficiently reduced in size. I have found that this "whirlpool" effect must be avoided, if a uniform dense foam is to be produced.

The discharge opening is located several inches above the top of the agitating arms so that a layer of foam forms a mat over the ascending foam and agitator, thus preventing air from being drawn in from the atmosphere to form unduly large bubbles during the final stage of agitation. It will be apparent that the bubbles constantly decrease in size during the action of the agitator, thus the density of the foam increases. In addition to acting as a mat to prevent inclusion of air from the atmosphere, this dense foam increases the downward pressure on the original large bubbles and facilitates their reduction in size under the action of the agitator.

As previously indicated the agitating arms or blades are given a "stream-line" contour, so that vacuum pockets are not formed as the arms rotate and thus no large bubbles are permitted to form and remain unreduced in size during agitation. For example, a rotating arm having a round or square rear edge would tend to produce a vacuum pocket, in which ascending large bubbles might be carried and thus avoid reduction in size. In order to make cellular building material of uniform strength and weight, it is necessary that the cells be of substantially uniform size and substantially uniformly distributed. This can only be attained when due regard is paid to the method of forming the foam. I have found, therefore, that vacuum pockets must not be formed, since these, as stated, inhibit the formation of a uniform foam.

It is necessary as previously stated to have the perforated plate completely covered with colloidalized water, so that the air rising through the small perforations may always be caught and held as a bubble, by a film of water. Experience has shown that the water should be kept at a constant height in order that uniform results may be obtained. The reason will be apparent on consideration. The size of the bubbles initially formed depends to a large degree on the hydrostatic pressure on the rising streams of air. The air pressure is constant and if the hydrostatic pressure varies, during the formation of the foam, bubbles of varying size are initially formed. The rate of agitation is constant, and therefore it follows that uniform sized bubbles in the finished foam can be produced only when the height of water is maintained constant.

For a given size of tank or cylinder maximum production is achieved by having the greatest number of the smallest possible perforations in the plate 2, which with a fixed air velocity permits relatively small bubbles to form initially, thus giving the agitator the least amount of work to do in reducing the size of the bubbles. The uniformity of these perforations in the plate is of advantage for the reasons previously stated, namely for the attainment of uniform size to the bubbles initially formed.

It will be apparent that a foam of a required density may be readily formed by simple regulation of the operation of the process and apparatus described.

The term "colloidalized water" as used in the specification is intended to mean water containing a foaming agent of the character mentioned.

I claim:

1. The process of preparing a foam which comprises passing air in fine streams into a column of water in the lower part of a vessel and forming a foam which is supported on the surface of the water and agitating said foam only above the top surface of the water to restrict the agitation to the foam.

2. The process as described in claim 1 in which the water is maintained at a constant height in the vessel.

3. The process as described in claim 1 in which the air streams are of uniform cross section as they enter the water.

In testimony whereof I affix my signature.

GEORGE M. THOMSON.